United States Patent

Stark et al.

[11] Patent Number: 6,005,190
[45] Date of Patent: Dec. 21, 1999

[54] COVER FOR CEILING-MOUNTED ELECTRICAL OUTLET

[75] Inventors: Thomas S. Stark, Coral Springs, Fla.; Thomas J. Gretz, Clarks Summit, Pa.

[73] Assignee: Arlington Industries, Inc., Scranton, Pa.

[21] Appl. No.: 09/196,718

[22] Filed: Nov. 20, 1998

Related U.S. Application Data

[63] Continuation-in-part of application No. 09/004,478, Jan. 8, 1998, abandoned.

[51] Int. Cl.⁶ .............................. H05K 5/03; H02G 3/14; H02G 3/20
[52] U.S. Cl. ............................................. 174/66; 220/241
[58] Field of Search ....................... 174/66, 67; 220/241, 220/242, 3.8; 48/906

[56] References Cited

U.S. PATENT DOCUMENTS

| | | | |
|---|---|---|---|
| 877,684 | 1/1908 | Vibber | 220/3.8 |
| 998,119 | 7/1911 | Peterson | 174/66 |
| 1,835,633 | 12/1931 | Calderwood | 220/241 X |
| 2,211,819 | 8/1940 | Innis | 174/66 X |
| 2,492,115 | 12/1949 | Crowther | 174/66 X |
| 2,740,873 | 4/1956 | Cronk | 174/66 X |
| 3,197,549 | 7/1965 | Good | 174/66 |
| 3,619,477 | 11/1971 | Rasmussen | 174/66 |
| 3,859,454 | 1/1975 | Mann | 174/66 |
| 4,733,330 | 3/1988 | Tanaka et al. | 220/3.8 X |
| 5,533,636 | 7/1996 | Reiker | 174/66 X |

*Primary Examiner*—Dean A. Reichard

[57] ABSTRACT

A cover and bracket are provided for covering ceiling junction box openings in which there are no visible connecting devices on the face or outer surface of the cover. The cover has an inner surface and an outer surface. A peg, which can be notched is connected to the inner surface of the cover. The bracket is connected to the junction box with connectors such as bolts or screws, and has a central engagement opening which is sized and shaped to selectively receive and frictionally engage the peg such that the cover holds fast to the junction box and covers the junction box opening. In a preferred embodiment, the central engagement opening contains spring engagement tabs which provide frictional holding of the peg. According to a further preferred embodiment, the central engagement opening is elongated to permit inversion of the bracket for installation over junction boxes that are recessed into the ceiling.

11 Claims, 6 Drawing Sheets

COVER FOR CEILING-MOUNTED ELECTRICAL OUTLET

This application is a continuation-in-part of U.S. patent application Ser. No. 09/004,478 filed Jan. 8, 1998 for "Cover for Ceiling-Mounted Electrical Outlet", now abandoned

BACKGROUND OF THE INVENTION a) Field of the Invention

This invention relates to covers and closures, and more particularly, to covers of electrical outlets and junction boxes.

b) Description of the Prior Art

Unlike most wall mounted junction boxes, ceiling mounted junction boxes are frequently covered immediately after installation, as homeowners usually wish to decide on ceiling fixtures at a later time. This is often due to the wide variety of lights and fans and combinations available in many styles and sizes for ceiling installation. Earlier covers were usually of the cup or pie plate type. Such prior art covers were typically attached to the junction box using a bracket and screws. This prior art bracket included a threaded hole in its center, and a short length of small diameter threaded pipe threaded into the threaded hole in the bracket. The prior art cover included a hole in its center which was sized to receive the pipe. A decorative cap nut, in this prior art arrangement, was used to engage the protruding pipe and secured the prior art cover to the junction box.

Such prior art covers, although perhaps effective at covering the junction box, were highly visible and, to some, marred the appearance of the ceiling. Later, flat cover plates were developed to maintain a low-profile when attached to the ceiling, thereby being less noticeable. The flat prior art cover plates were usually held in place against the ceiling by flat headed bolts that were screwed into threaded holes of a bracket. This type of prior art cover was an improvement over the earlier version in that it was less noticeable, however, the heads of the securing bolts had to be painted to match the cover and the surrounding ceiling. During installation of this type of cover, it was common for the installer to mar the surface of the cover while tightening the bolts (or screws) of the cover. The paint frequently chipped, making the cover visible and distracting. The cover of this type usually required "touch-up" with paint after the cover had been installed. It is characteristic of prior art covers that no matter how small or decorative, the connecting mechanism is always visible and apparent.

It is therefore an object of the invention to provide a cover for electrical junction boxes which overcomes the deficiencies of the prior art.

It is another object of the invention to provide such a cover which attaches to a junction box without noticeable fasteners.

SUMMARY OF THE INVENTION

A cover plate for a ceiling-mounted electrical-junction box includes an inner surface and an outer surface. A peg is connected to the inner surface and extends generally perpendicularly therefrom a predetermined distance. According to a first embodiment, the peg includes notches along its side. A bracket is sized and shaped to be secured to the junction box, and includes an engagement opening. The engagement opening is sized and shaped to selectively receive and frictionally engage with the notches of the peg so that the cover holds fast to the bracket and covers the junction box opening.

According to another embodiment, the peg has no notches and the engagement opening is sized and shaped to frictionally engage with the peg and hold the cover against the junction box.

The engagement opening preferably includes flexible tabs which support the peg and engage the notches of the peg as it is advanced into the engagement opening.

DETAILED DESCRIPTION OF THE INVENTION

Figure 1:
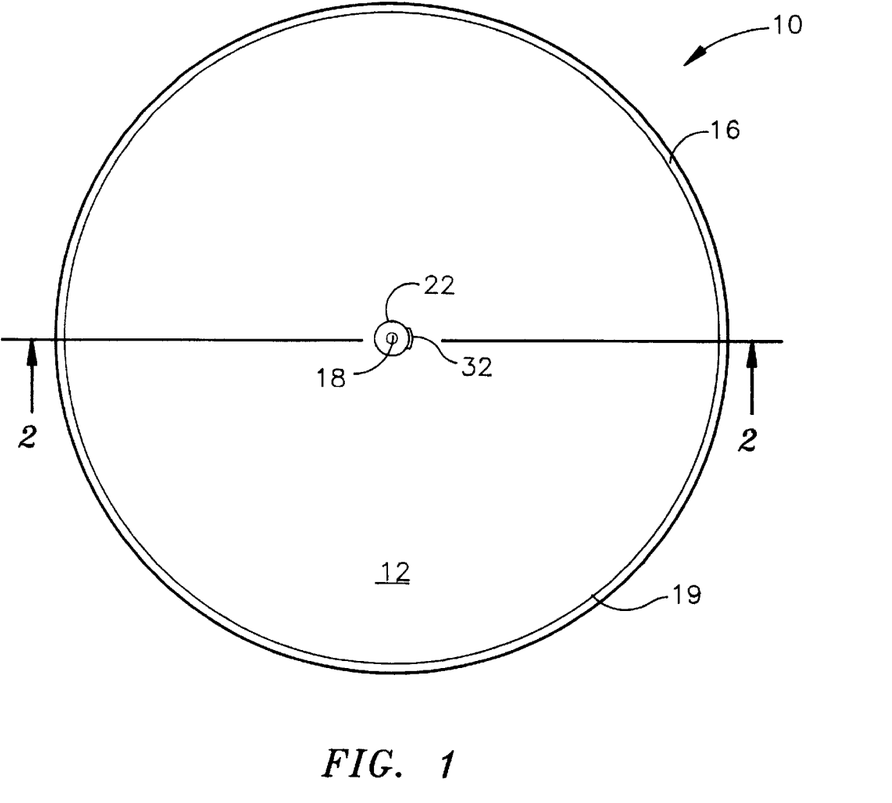
FIG. 1 is a top plan view of a round, flat, cover plate, according to the invention.
Figure 2:
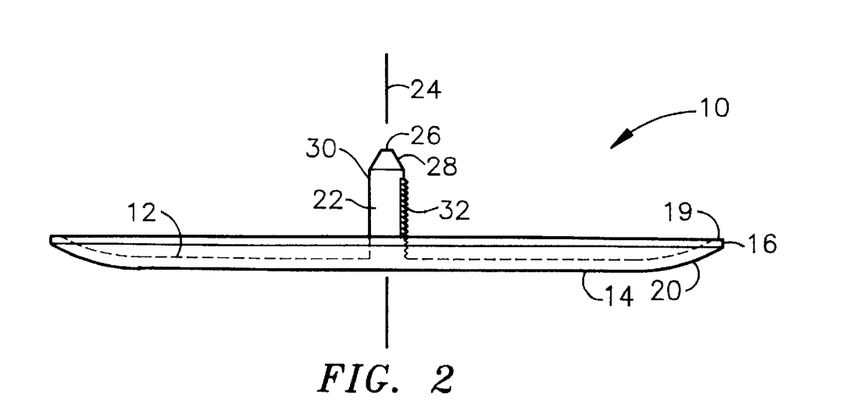
FIG. 2 is a sectional view of the cover plate, taken along the lines 2—2 of FIG. 1, showing a notched peg at the center of the cover plate, according to the invention.

Referring to FIGS. 1 and 2, a flat cover plate 10 is shown defining an inner surface 12, an outer surface 14, a perimeter surface 16, a center point 18, and a rim 19. It is preferred, in this embodiment, that perimeter surface 16 and outer surface 14 meet with a beveled edge 20, as shown, and that cover plate 10 is made from plastic. A peg or pin (hereinafter called "peg") 22 is attached to inner surface 12, extending generally perpendicularly from cover plate 10, as shown in FIG. 2, along an axis 24. Peg 22 is preferably integrally formed with cover plate 10 and is positioned at center point 18. Peg 22 includes a remote end 26 which has a tapered surface 28, and a side surface 30. Although peg 22 may have any cross-sectional shape without departing from the gist of the invention, it is preferred that peg 22 have a generally circular cross-section, centered along axis 24.

Figure 3:
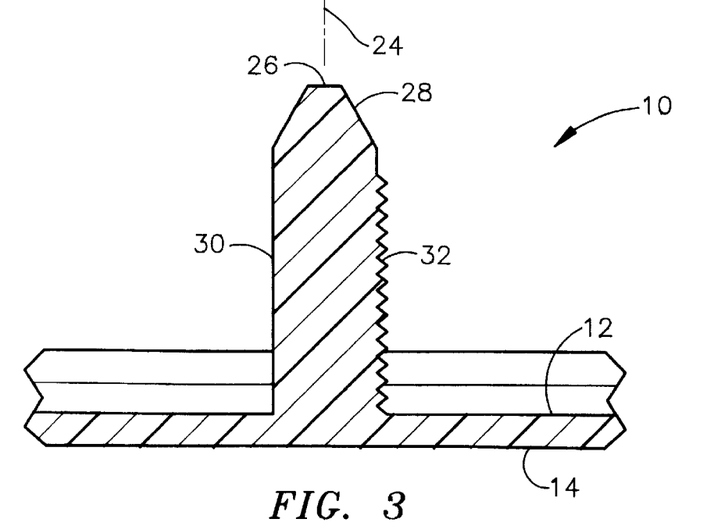
FIG. 3 is a partial sectional view of the cover plate showing in detail the notched peg, according to the invention.

Referring to FIGS. 1–3, located along side surface 30 of peg 22 are a set of notches 32 which extend along a line which is generally parallel to axis 24. Each notch of notches 32 preferably extends circumferentially about side surface 30 less than 90 arc degrees, as illustrated in FIG. 1, and protrudes a predetermined distance beyond the circular cross-sectional shape of peg 22, as shown in FIG. 3. However, notches 32 may have any shape and may extend circumferentially about side surface 30 greater than 90 arc degrees (including 360 arc degrees). Each notch 32 is preferably triangular in cross-section, as shown in FIG. 3.

Figure 4:
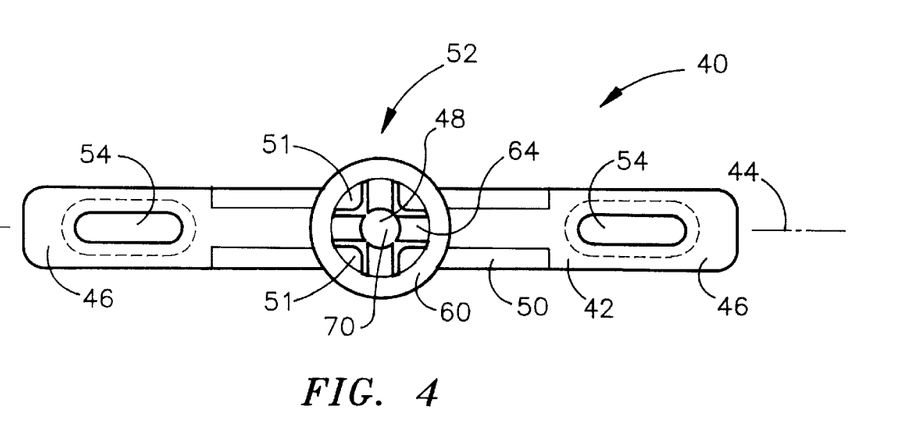
FIG. 4 is a top plan view of a connecting bracket according to the invention.
Figure 5:
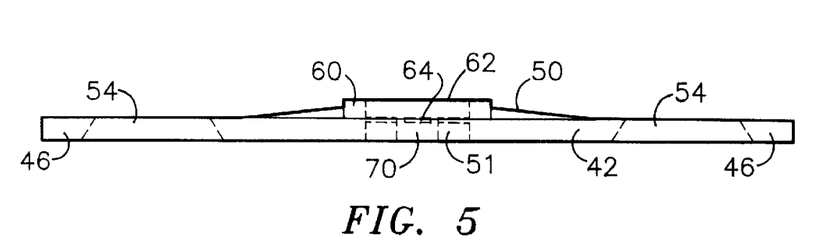
FIG. 5 is a side view of the connecting bracket of FIG. 4, according to the invention.
Figure 6:
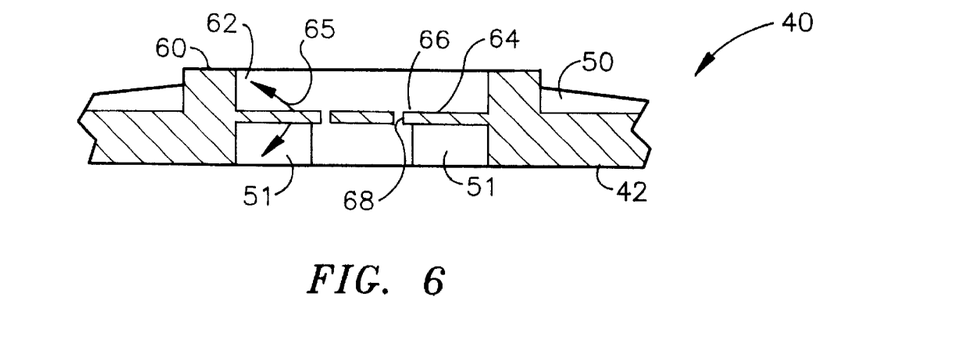
FIG. 6 is a partial sectional view of the connecting bracket of FIG. 4, showing details of the tabs in a center opening, according to the invention.

A bracket 40, according to a first embodiment of the invention, is shown in FIGS. 4–6 and is used to secure cover plate 10 to a junction box, as described in detail below. Bracket 40 is secured to the junction box using fasteners 41 (shown in FIG. 7). Bracket 40 includes an elongated body 42 defining a longitudinal axis 44, two opposing ends 46 and a center point 48. Bracket 40 is preferably made from an strong resilient plastic, as detailed below and is appropriately reinforced with integrally molded ribs 50, and bosses 51 as those skilled in the art would appreciate. Located at center point 48, and preferably integrally formed with body 42 is a peg-engagement assembly 52. Located adjacent to each opposing end 46 and along elongated axis 44 is a slot 54 having a width (measured transverse to elongated axis 44) slightly greater than the shaft diameter of fastening screws 41 (see FIG. 7), and a length (measured along elongated axis 44) preferably at least greater than twice the shaft diameter of fastening screws 41 to provide linear displacement along elongated axis 44, which allows bracket 40 to be attached to junction boxes of several sizes and also allows bracket 40 to be easily centered, as described in greater detail below.

Peg-engagement assembly 52 includes a ring-shaped perimeter wall 60 defining a central opening 62, and radially-inwardly directed engagement tabs 64. Tabs 64 are preferably integrally formed with body 42 and are generally coplanar with body 42. There are preferably four such tabs which are equally spaced at 90 arc degree intervals within wall 60 so that, as described below, at least one tab 64 will engage with notches 32 when peg 22 is inserted into bracket 40. Tabs 64 are molded in such a manner to provide a spring-like resiliency to each tab while maintaining its structural integrity, perhaps using conventional plastic-injection molding techniques known by those skilled in the art. In this arrangement, each tabs 64 is resiliently displaceable along an arcuate path 65, illustrated for one tab 64 in FIG. 6.

Each tab 64 includes a remote end 66 which is generally adjacent to center point 48 and includes an arcuate edge 68 so that collectively the four tabs define a circular opening 70 located at center point 48. Remote end 66 of each tab 64 is preferably formed as an arc having essentially the same radius as peg 22 so that the contact between each tab 64 and peg 22 is maximized. Circular opening 70 has an effective diameter which is at least equal to, and preferably smaller than the diameter of peg 22.

Peg 22 must be sufficiently rigid and strong to be pushed though the circular opening 70 of bracket 40 and deflect the tabs sufficiently that they hold the peg secure.

Figure 7:
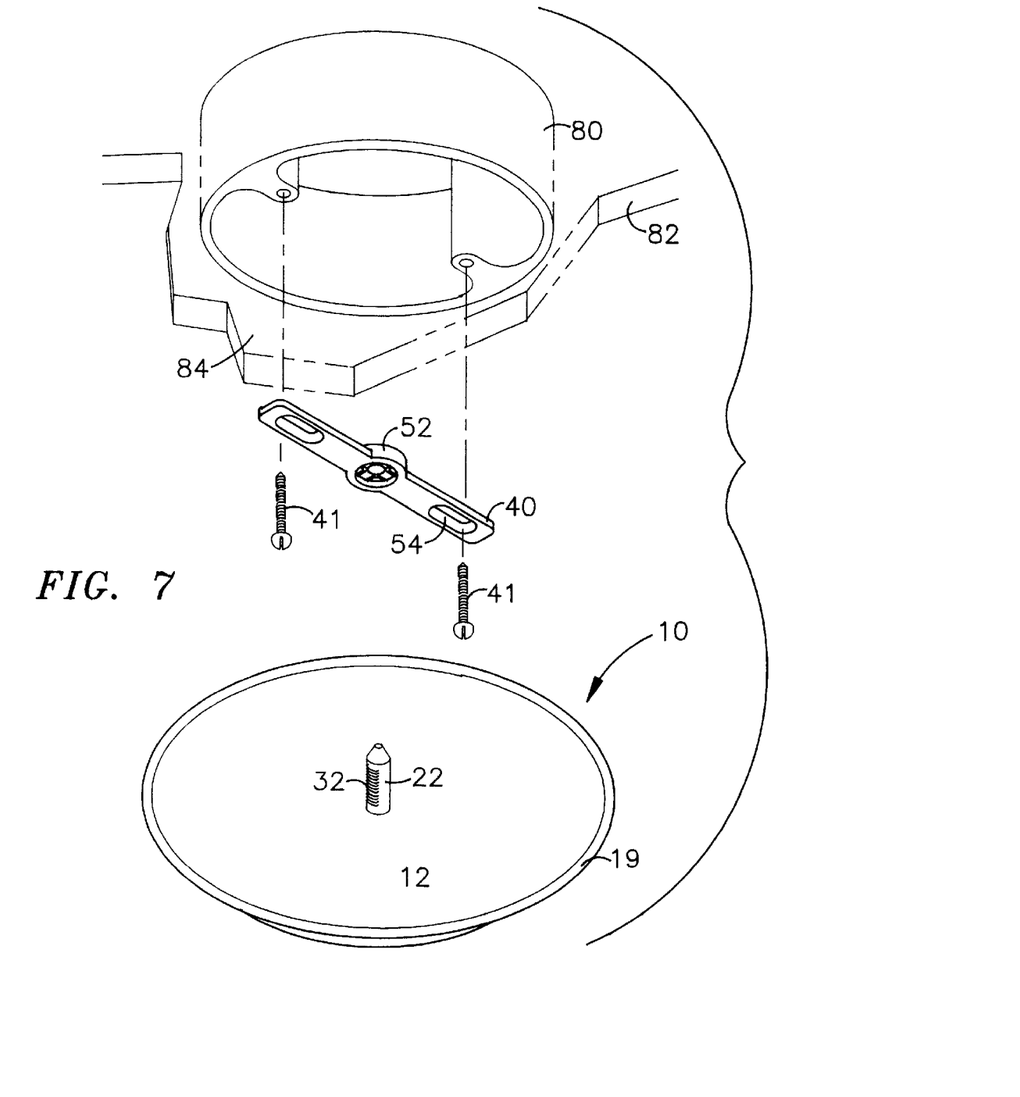
FIG. 7 is an assembly view of the cover exploded, showing an electrical junction box, the connecting bracket and the cover plate, according to the invention.

In operation of the invention, referring to FIG. 7, an electrical junction box 80 is mounted within a wall or ceiling structure 82 so that an opening 84 of junction box 80 is exposed through structure 82, as shown. According to this embodiment of the invention, bracket 40 is first secured to junction box 80 using fasteners 41 which pass through slots 54 and engage with threaded openings provided with junction box 80. Prior to tightening fasteners 41, bracket 40 may be linearly displaced between fasteners 41 so that bracket 40 is generally centered with respect to opening 84 of junction box 80. Fasteners 41 are then tightened.

Once bracket 40 is attached to junction box 80, cover plate 10 is attached to bracket 40 by inserting peg 22 into circular opening 70 of peg-engagement assembly 52. As peg 22 passes through circular opening 70, at least one resilient tab 64 flexes along arcuate path 65 to accommodate notches 32. The remaining tabs 64 function to guide and support peg 22 and may also provide frictional engagement with side surface 30 of peg 22, or other notches 32 if used in other related embodiments of this invention. Peg 22 is advanced into circular opening 70 until cover plate 10 abuts the surface of structure 82 (e.g., the ceiling). The resilient nature of cover plate 10 and tabs 64 allow slight deformation of cover plate 10 upon insertion so that cover plate is tightly drawn against the surface of structure 82.

The frictional engagement between notches 32 and tabs 64 is sufficient to hold cover plate 10 tightly against the surface of structure 82, yet easily overcome through prying should it be necessary to remove cover plate 10 from junction box 80 without damaging tabs 64. Cover plate 10 may be re-installed following the steps listed above.

According to a second embodiment, peg 22 may be provided without notches 32 (i.e., a generally smooth side surface 30). In such instance, tabs 64 will be sized to define a central opening 70 which is perhaps considerably smaller than the diameter of peg 22 so that upon insertion of peg 22 into opening 70, all tabs 64 will flex against outer surface of peg 22 and hold peg 22 securely through surface friction alone.

Figure 8:
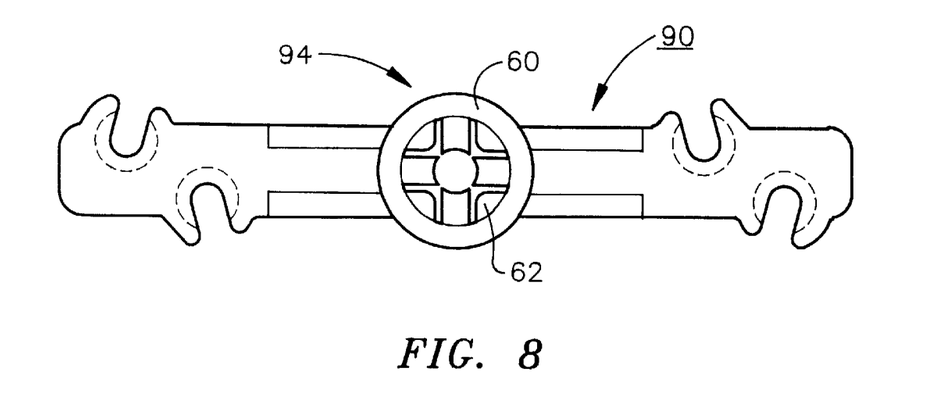
FIG. 8 is a plan view of a connecting bracket, according to a second embodiment of the invention which is suitable for connecting to two different sizes of electrical junction boxes.

Referring to FIG. 8, a bracket 72 is shown, according to another embodiment of the invention including a body 73, a peg-engagement assembly 74, and two opposing ends 75. According to this embodiment, two opposing side-accessible slots 76, 77 are formed adjacent to each opposing end 75. This bracket functions in an almost identical manner to bracket 40 of FIG. 4, except it is self-centering on the junction box. In operation of bracket 72, securing bolts 41 only have to be partially withdrawn to remove the bracket from the junction box. Bracket 72 is attached to loose fasteners through angular rotation of body 73 so that fasteners 41 slide into the appropriately spaced slots 76, 77. Bracket 72, shown in FIG. 8 can fit two types of junction boxes and upon securement to fasteners 71, bracket 72 becomes self-centering, automatically positioning peg-engagement assembly approximately equidistant between fasteners 41.

The cover plate is preferably made from a relatively rigid plastic and the optionally notched peg is made of the same plastic and is formed as part of the cover plate. While any rigid thermoplastic polymer can be used, it is preferred that the thermoplastic be suitable for injection molding. Illustrative of thermoplastic polymers which can be used are polyvinyl chloride, polyamides, polyethylene, polypropylene, polystyrene, polyethylene terephthalate, polycarbonate and the like. Copolymers can also be employed as can suitable ionomers. Polyvinyl chloride is the preferred polymer because of its functional properties and relative ease of manufacture.

Since it is usually desired to have the cover plate blend in with the ceiling it is preferred that the polymer be formulated to contain fillers and pigments which approximate the color of the ceiling (painted). A common color of ceilings is white or off-white. Other ingredients may be incorporated into the polymer formulation such as stabilizers, lubricants and the like.

The connecting bracket is also made from thermoplastic and can also be made by injection molding. While any of the polymers recited above can be employed, it is not necessary that bracket 40 be any particular color. It can be any color or clear. It is preferred that bracket 40 be a bright color, such as red, as it will eventually be hidden, but when installing it, this color is easily seen.

As noted above it is desirable that the face of cover plate 10 blend in with the ceiling, for the same reason it is desirable that the face of cover plate 10 be embossed or etched with a finely detailed textured surface (such as a matte finish) to eliminate gloss, reflective or high glare, which would stand out against the ceiling. This "embossment" can be created by providing a texture to the surface of the injection mold. The texture should be unobtrusive and further blend with the ceiling.

The dimensions of cover plate 10 should be sufficiently large to cover the junction box opening in the ceiling. Frequently this opening is cut somewhat oversize and for that reason some leeway should be provided. Additionally, different size junction boxes require different size openings. Accordingly, different size cover plates should be provided for different size junction boxes. It has been found that a cover plate of about 4¾ inches is satisfactory for a 4 inch junction box opening and is the preferred size for that size box. It can of course be larger.

Peg 22 preferably has a diameter of ¼ inch. Notches 32 preferably extend beyond the side surface 30 of peg 22 by about 1/32 of an inch. An opening formed by tabs 64 of slightly less than about 9/32 of an inch has proven to be satisfactory for tightly receiving a notched peg of the cited dimensions. Notches 32 are preferably relatively fine so that the distance between the notches is small and a tighter fit against the ceiling may be achieved. Notches 32 having a count of about 26 to the inch have been found to be satisfactory, but other sized notches and notch-spacing could be used. In fact if the diameter of peg 22 is increased slightly from the illustrated sizes, the notches may be eliminated, as described above.

While the foregoing dimensions are preferred, they can of course be varied, provided the resultant peg is easily advanced into opening 70 formed by tabs 64, and tabs 64 are of sufficient dimensions to engage and hold peg 22 tightly, as described above.

Figure 9:
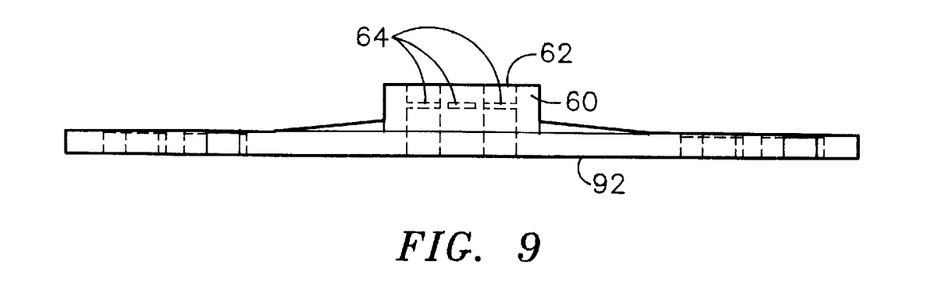
FIG. 9 is a perspective view of the cover plate of this invention showing the central position of the notched peg.

The length of peg 22 must be sufficient that it can pass through opening 70 formed by tabs 64 and engage tabs 64. For a flat cover plate, it has been found that a peg 13/16 of an inch in length is satisfactory. The present invention may be applied to a variety of different shaped cover plates, including flat (as described above and shown in FIGS. 1–2), saucer shaped, as shown in FIG. 9, or a deep saucer shape, such as a cup shape (not shown). The distance between the inner surface and the rim of the cover plate increases in the saucer shape and the cup shape plates. In such versions, the length of peg 22 must be sufficiently long to extend beyond the inner surface of the cover plate and reach the peg-engagement assembly 52.

Figure 10:
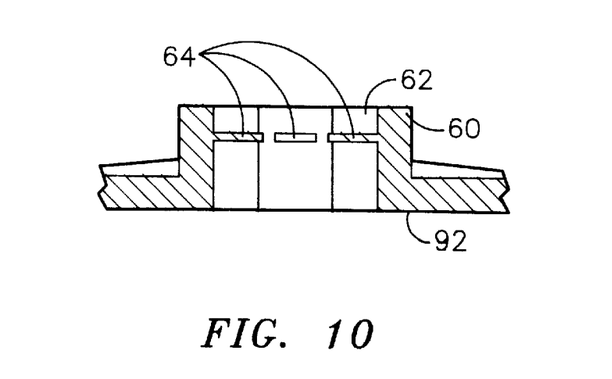
FIG. 10 is a close up view of a portion of FIG. 9.

In some installations, it has been found that the junction box is mounted recessed as much as ¾ of an inch behind the outermost surface of the ceiling drywall. Such applications have necessitated the design of an alternative bracket 40 which is depicted in FIGS. 8–10. Modified bracket 90, shown in these figures, differs from bracket 40 described hereinabove, in the length of perimeter wall 60 of peg-engagement assembly 52 and consequently, the location of tabs 64 relative to the outer surface 92 of modified bracket 90. In this embodiment, engagement assembly 52 has been lengthened to form a tube shaped engagement assembly 94. As described hereinabove, tabs 64 are generally coplanar with body 42. According to the embodiment depicted in FIGS. 8–10, tabs 64 are located within central opening 62, but more remote from outer surface 92 of body 42 at the upper end of central opening 62 in tubular, extended peg-engagement assembly 94. The purpose of this configuration is shown in FIGS. 11 and 12.

Figure 11:
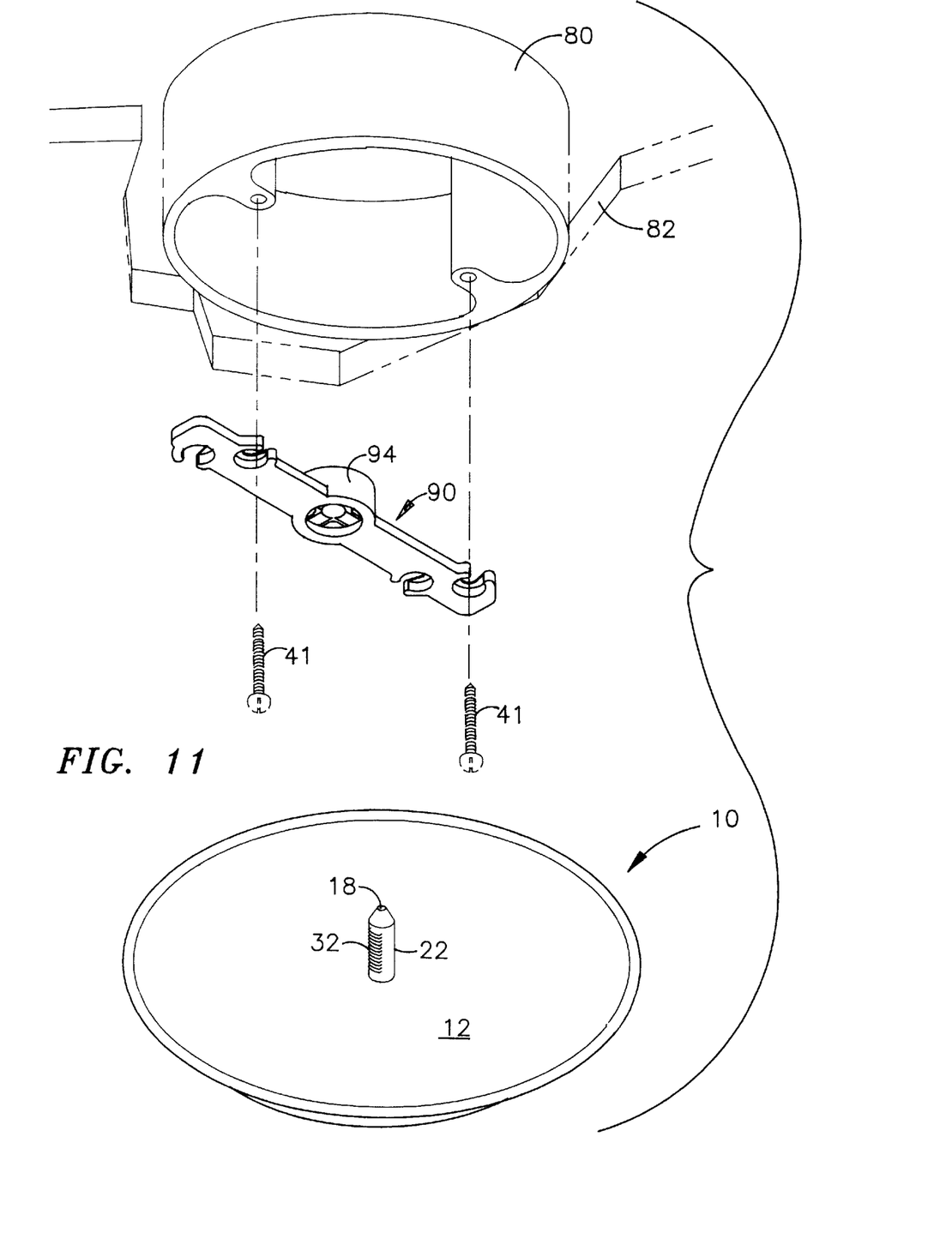
FIG. 11 is an exploded view of the second embodiment of the invention.

As shown in FIG. 11, when the ceiling-mounted junction box 80 is mounted flush with ceiling drywall 82, modified bracket 90 is mounted such that extended peg-engagement assembly 94 extends into junction box 80 leaving outer surface 92 relatively flush with the surface of drywall 82, while permitting peg 22 to engage tabs 64 in the normal fashion.

Figure 12:
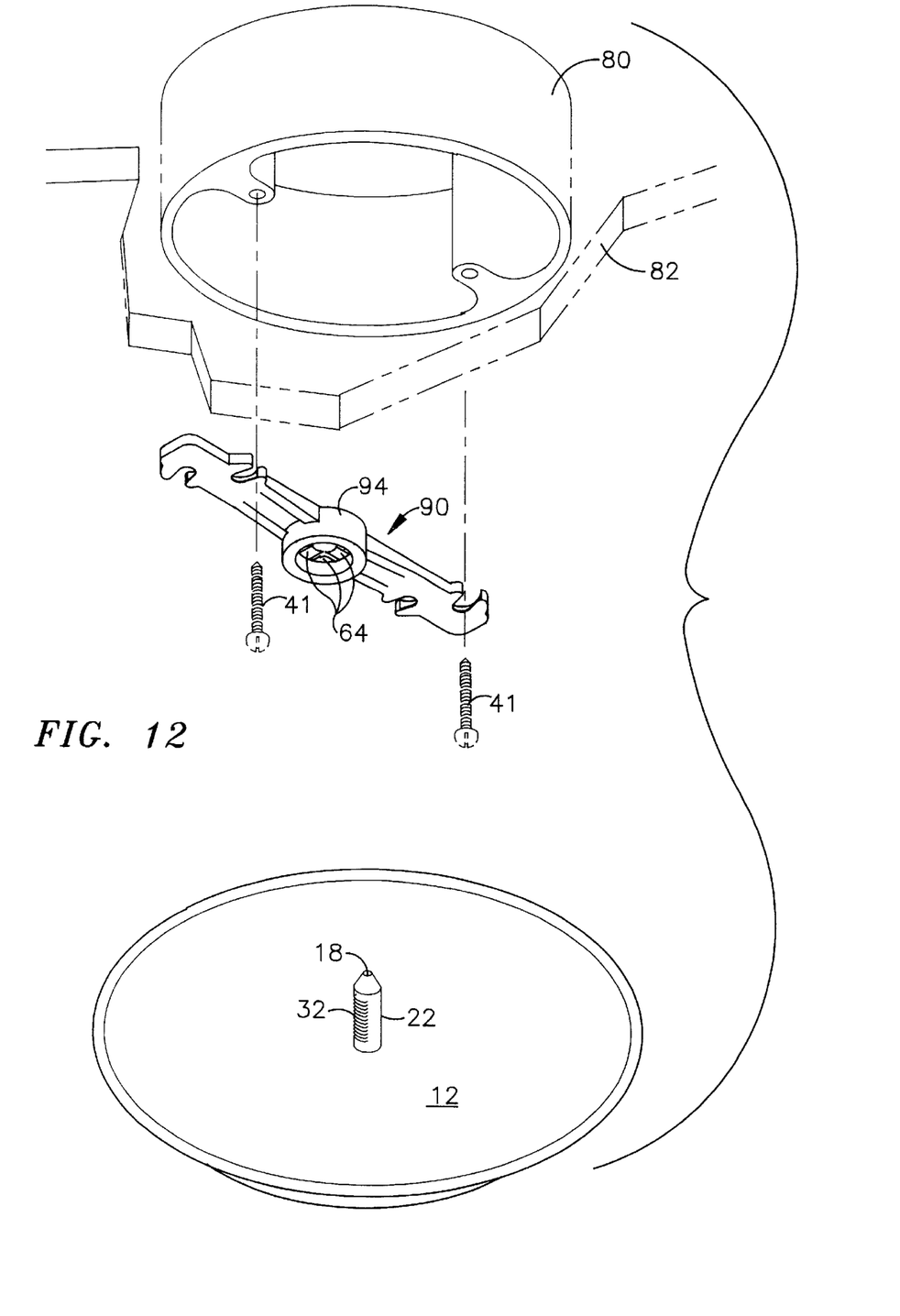
FIG. 12 is an exploded view of the second embodiment of the invention.

However, when junction box 80 is mounted recessed into dry wall 82, as shown in FIG. 12, modified bracket 90 is inverted or flipped over such that extended peg-engagement assembly 94 extends outward or away from junction box 80 such that, when peg 22 is inserted to engage tabs 64, allowance is provided for the offset of the recess and peg 22 more easily and readily engages tabs 64 at the lower extremity of peg-engagement assembly 94.

From the foregoing description, one skilled in the art can easily ascertain the essential characteristics of this invention, and without departing from the spirit and scope thereof, make various changes and modifications of the invention to adapt it to various usages and conditions. It is therefore intended that the scope of the invention be limited only by the scope of the appended claims.

What is claimed is:

1. A cover for covering a ceiling opening of an electrical junction box, said cover comprising:
   a shaped cover defining an inner and an outer surface;
   a peg connected to said inner surface and extending from said inner surface;
   a bracket, sized and shaped to be secured to said junction box, said bracket including an engagement opening, said engagement opening being sized and shaped to selectively receive and frictionally engage said peg so that said cover holds fast to said bracket and covers said junction box opening; and said bracket having two ends and having two pairs of edge notches with each pair of edge notches spaced different distances from said two ends with said edge notches being configured to receive securing bolts and one pair of said edge notches spaced to be placed over bolt openings in said junction box.

2. The cover of claim 1 wherein said cover is a flat plate.

3. The cover of claim 2 wherein said cover is saucer shaped in a cross-sectional view and circular in a top view.

4. The cover of claim 1 wherein said peg has at least one notch on its surface.

5. The cover of claim 4 wherein said peg has a raised strip along a portion of its length.

6. The cover of claim 1 wherein said engagement opening contains at least one spring tab, to selectively receive and frictionally engage said peg.

7. The cover of claim 6 wherein said engagement opening contains four spring tabs to selectively receive and frictionally engage said peg.

8. The cover of claim 1 wherein said engagement opening comprises a tube extending at a right angle from one surface of said bracket.

9. The cover of claim 8 wherein said tube has a first end proximate said surface of said bracket and a second end remote from said surface of said bracket, and of said at least one spring tab is located closer to said second end than to said first end.

10. The cover of claim 9 wherein said bracket can be inverted to vary the distance between said bracket and said shaped cover when said electrical junction box is recessed.

11. A thermoplastic ceiling cover plate for covering an opening of an electrical junction box, said cover plate comprising:

a flat plate defining an inner and an outer surface;

a notched peg connected to said inner surface and extending a length from said inner surface;

said outer surface being finely textured;

a bracket, sized and shaped to be secured to said junction box, said bracket including an engagment opening, containing four spring tabs being sized and shaped to selectively receive and engage said notched peg, so that said flat plate holds fast to said junction box and covers said junction box; and said bracket having two ends and having two pairs of edge notches with each pair of edge notches spaced different distances from said two ends with said edge notches being configured to receive securing bolts and one pair of said edge notches spaced to be placed over bolt openings in said junction box.

\* \* \* \* \*